March 12, 1946.  J. S. YAGER  2,396,359
WILD GOOSE AND DUCK CALL
Filed April 13, 1945
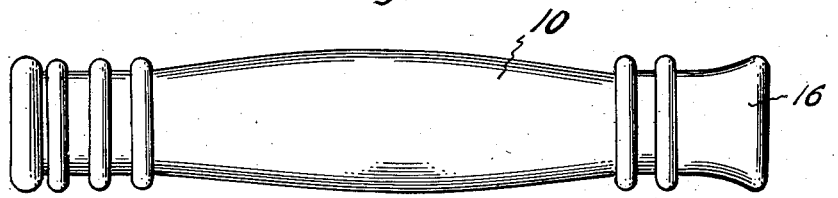
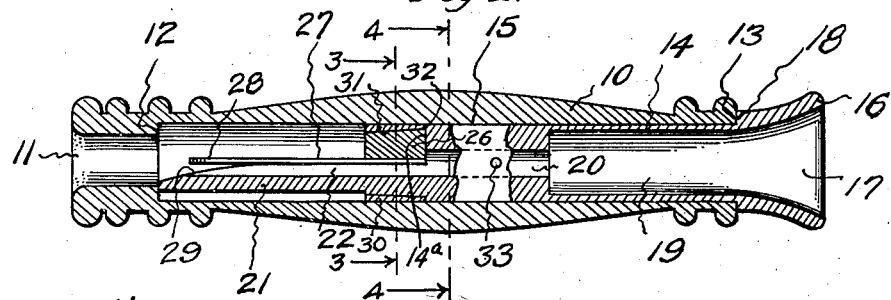
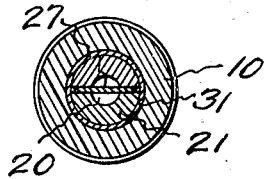 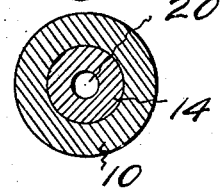 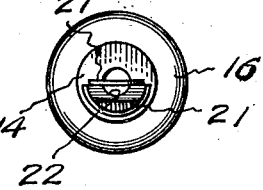
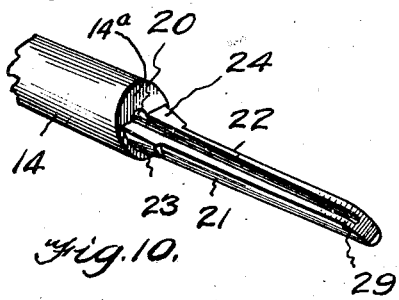 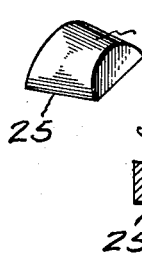 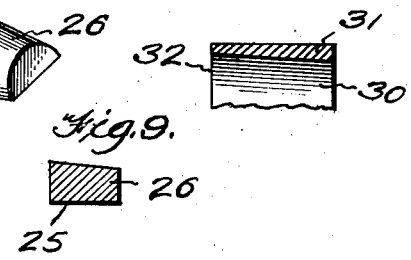
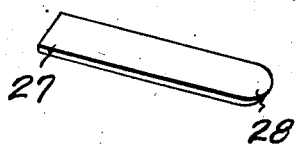
Inventor
JOSEPH S. YAGER
By *[signature]*
Attorney Patented Mar. 12, 1946

2,396,359

UNITED STATES PATENT OFFICE 2,396,359

WILD GOOSE AND DUCK CALL

Joseph Stevenson Yager, Greenville, Miss.

Application April 13, 1945, Serial No. 588,130

1 Claim. (Cl. 46—180)

This invention relates to a wild goose and duck call, and has for one of its objects the production of a simple and efficient instrument which is so constructed as to simulate the call of a wild goose and a wild duck, when operated.

Another object of this invention is the production of a simple and efficient instrument which may be easily assembled, and also easily adjusted to firmly hold the reed in place upon the blowing element.

A still further object of the invention is the production of a simple and efficient instrument wherein the blowing element is adjusted longitudinally of the casing so that the call of a goose may be simulated when the blowing element is placed in one position within the barrel or casing and the blowing element may be adjusted to a second position where the blowing element is extended beyond the barrel or casing to simulate the call of a duck, when operated.

In the drawing:

Figure 1 is a side elevational view of the improved device;

Figure 2 is a longitudinal sectional view;

Figure 3 is a transverse sectional view taken on line 3—3 of Figure 2;

Figure 4 is a transverse sectional view taken on line 4—4 of Figure 2;

Figure 5 is an end elevational view of the blowing element removed from the casing or barrel;

Figure 6 is a fragmentary perspective view illustrating the reed carrying portion of the blowing element;

Figure 7 is a perspective view of the wedge for holding the reed in position;

Figure 8 is an enlarged sectional view of a portion of the wedging rings;

Figure 9 is a longitudinal sectional view through the wedge; and

Figure 10 is a perspective view of the reed.

By referring to the drawing, it will be seen that 10 designates the barrel or casing which is provided with an open end 11 having an abutment shoulder 12 inwardly spaced from the opening 11. The opposite end of the casing or barrel 10, is also open as indicated at 13 for receiving the blowing element 14. The barrel or casing 10 is provided with longitudinally extending bore 15 into which the blowing element is placed.

The blowing element 14 is provided with a flared mouth-piece 16 having an opening 17 at its outer end, and this mouth-piece 16 is provided with an abutment shoulder 18 which is adapted to abut against the outer open end 13 of the barrel or casing 10. The blowing element 14 is provided with an enlarged central bore 19 which terminates in a restricted bore 20 near its opposite end. The blowing element 14 is also provided with a projecting tongue portion 21, which tongue portion is in turn provided with a longitudinally extending channel 22 which communicates at its inner end with the restricted bore 20. At a point constituting the junction of the tongue 21 with the body of the blowing element 14 a tapered base 23 is provided constituting a semi-spherical base portion having a flat upper face 24 upon which the flat lower face 25 of the tapering wedge or wedge block 26 fits. The blowing element 14 is provided with an abutment shoulder 14$^a$ at the junction of the tongue portion 21 with the blowing element. The wedge 26 abuts against this shoulder 14$^a$ to limit the movement of the wedge 26 in one direction. A reed 27 of a suitable type rests upon the tongue 21 and overlies the channel 20, as shown, the projecting end 28 being free to flex relative to the receding curved face 29 formed near the end of the tongue 21—note Figure 2. A clamping ring 30 is provided with a tapering inner face 31 tapering toward its end 32 and is fitted over the conical portion 23 and the wedge 26 to firmly hold the reed in place and to provide a wedging binding action. The inner end of the blowing element 14 abuts against the shoulder 12 of the casing or housing 10, as shown.

It is preferable that the blowing element 14 be formed of one piece with the exception of the wedge 26, the tongue 27 and the wedging ring 30.

It should be understood that the blowing element 14 is slidably mounted within the bore 15 of the casing or housing 10 and to simulate the call of a wild goose the blowing element 14 is placed in the position shown in Figure 2 wherein the inner end of the blowing element 14 abuts against the shoulder 12 and the shoulder 18 abuts against the outer open end of the casing or barrel 10. To simulate the call of a wild duck, the blowing element is pulled out of the barrel 10 to a point where the indicating mark preferably in the nature of a pin 33 extending flush with the outer wall of the member 14 registers with the extremity of the open end 13 of the barrel 10. In other words, the two calls are made possible by extending or reducing the air column within the instrument.

One of the important features of the present device is its simplicity of assembly which will also facilitate the replacement of parts should they become lost or injured. The structure will also facilitate the clamping of parts in position to hold the removable reed 27 in a proper position relative to the tongue 21. The device may be made of any suitable material, but it has been found preferable to construct the same of plastic material.

It should be understood that certain detail changes in the mechanical construction of the device may be employed without departing from the spirit of the invention, so long as such changes fall within the scope of the appended claim.

Having described the invention, what is claimed is:

A device of the class described comprising a hollow barrel, a blowing element mounted within the hollow barrel and adjustable longitudinally of the barrel, said blowing element having a mouth-piece at one end, the blowing element having a projecting tongue at its opposite end, the projecting tongue having a channel extending longitudinally thereof, the blowing element having a communicating bore, a reed fitting upon said tongue and overlying said channel, the tongue having a face receding away from the reed for a portion of its length, a tapering wedge block fitted upon said reed, the blowing element having an abutment shoulder against which said wedge block rests, a tapering clamping ring fitting over said tongue and wedge block for clamping the reed in position upon said tongue, said tongue having a tapering base over which said tapering ring is adapted to fit, and said tongue also having a flat upper face at its inner end adjacent the abutment shoulder to provide a rest for said tapering block.

JOSEPH STEVENSON YAGER.